United States Patent
Schurig et al.

[19]

[11] Patent Number: 6,089,648
[45] Date of Patent: Jul. 18, 2000

[54] MOTOR VEHICLE INCLUDING A RETRACTABLE CLOSURE PANEL

[75] Inventors: Darren Schurig, Irvine, Calif.; Jonathan L. Rundels, Rochester, Mich.

[73] Assignee: DaimlerChrysler Corporation, Auburn Hills, Mich.

[21] Appl. No.: 09/222,564

[22] Filed: Dec. 29, 1998

[51] Int. Cl.[7] .............................. B60J 5/02; B62D 25/06
[52] U.S. Cl. .......................... 296/146.8; 296/106; 49/276
[58] Field of Search .............................. 296/50, 52, 106, 296/146.8; 49/152, 157, 163, 188, 213, 276, 360

[56] References Cited

U.S. PATENT DOCUMENTS

| | | | |
|---|---|---|---|
| 2,622,919 | 12/1952 | Scott | 296/155 |
| 2,658,792 | 11/1953 | Scott | 49/163 |
| 3,021,174 | 2/1962 | Rund | 296/107.2 |
| 5,104,172 | 4/1992 | Schildt | 296/50 |
| 5,110,172 | 5/1992 | Ney et al. | 296/50 |
| 5,501,503 | 3/1996 | Thayer | 296/146.8 |
| 5,688,019 | 11/1997 | Townsend | 296/155 |
| 5,921,611 | 7/1999 | Townsend | 296/155 |
| 5,944,378 | 8/1999 | Mather et al. | 296/219 |

*Primary Examiner*—D. Glenn Dayoan
*Assistant Examiner*—Paul Chenevert
*Attorney, Agent, or Firm*—Mark P. Calcaterra

[57] ABSTRACT

A motor vehicle includes a closure panel fully retractable below the level of the floor of the vehicle. Typically, the motor vehicle includes a body having a rear bumper assembly and first and second laterally spaced apart sides. The body defines a rear opening. A floor extends between the pair of laterally spaced apart sides. A rear storage area is at least partially defined by the first and second laterally spaced apart sides and the floor. The rear storage area is accessible through the rear opening. The closure panel is a rear closure panel operative for selectively closing the rear opening. The closure panel is attached to the body for movement between a closed position and an open position. In the closed position the closure panel at least partially closes the opening and is positioned immediately above the rear bumper assembly. In the open position the closure panel is disposed completely below the floor.

20 Claims, 4 Drawing Sheets

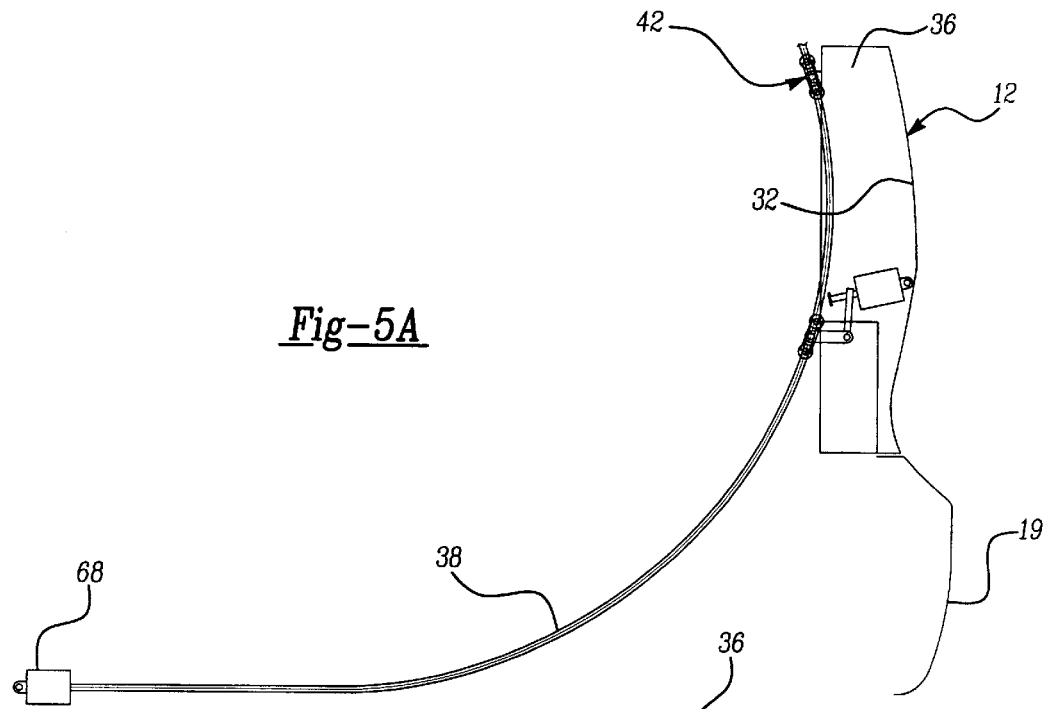
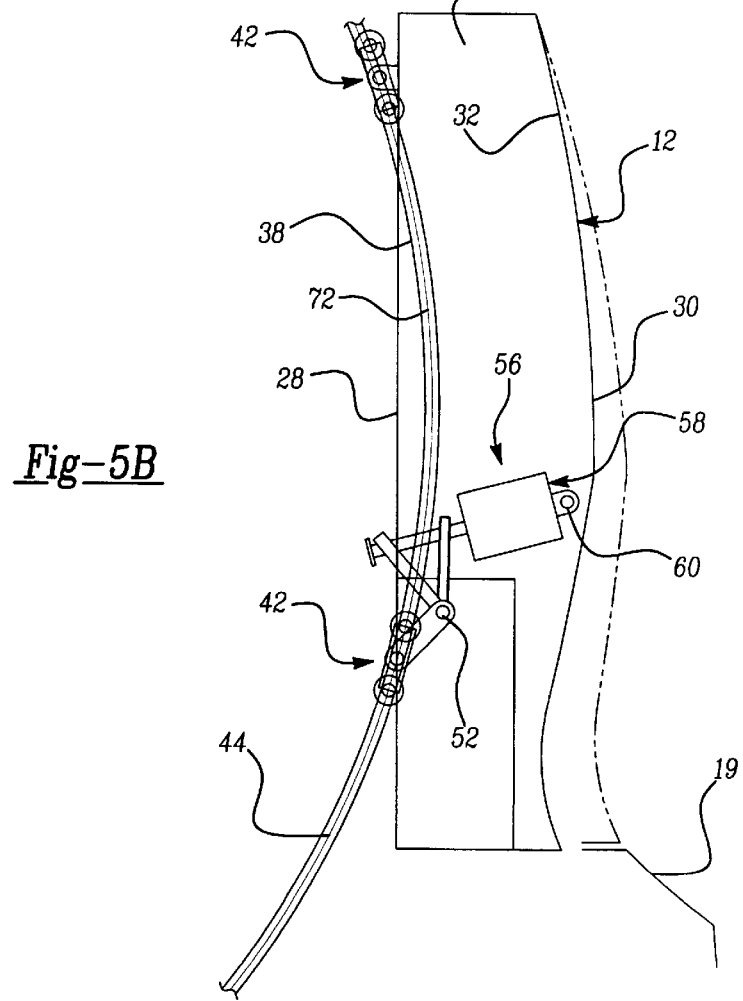

MOTOR VEHICLE INCLUDING A RETRACTABLE CLOSURE PANEL

BACKGROUND OF THE INVENTION

1. Technical Field

The present invention generally pertains to motor vehicles. More particular, the present invention pertains to a retractably closure panel for a motor vehicle. More specifically, but without restriction to the particular embodiment and/or use which is shown and described for purposes of illustration, the present invention relates to an arrangement for retracting a closure panel to a stored position below the surface of the vehicle's floor.

2. Discussion

Sport utility vehicles, station wagons, minivans and other similar vehicles generally include rear storage areas accessible through one or more rear closure panels. In one common arrangement, such vehicles are equipped with a liftgate which articulates between open and closed positions about an upper horizontal edge. In another common arrangement, such vehicles are equipped with a lower tailgate which pivots about a lower horizontal edge. Tailgates have also been employed which pivot about one of the lateral, vertical edges.

While known closure panels are suitable for providing access to the rear storage area of a motor vehicle, they are all associated with disadvantages. Most significantly insofar as the present invention is concerned, articulation of known closure panels from a closed position to an open position causes the closure panel to extend away from the body of the vehicle. When the vehicle is parked in a garage or near other vehicles sufficient operating clearances are often unavailable for opening the closure panel. Additionally, articulation of the closure panel away from the body of the vehicle increases the opportunity for damage to the closure panel, an adjacent vehicle, or both. Furthermore, known closure panels are not particularly suited for operation under power and are therefore difficult to open when the operator is carrying a child, groceries, or other load.

SUMMARY OF THE INVENTION

It is a general object of the present invention to provide a motor vehicle including a rear closure panel which overcomes the disadvantages associated with the prior known arrangements.

It is another object of the present invention to provide a motor vehicle including a closure panel which articulates to a stored position beneath the floor of the motor vehicle.

In one form, the present invention provides a motor vehicle having a body, a floor and a closure panel. The body defines an opening and includes a pair of laterally spaced apart sides. The floor extends between the pair of laterally spaced apart sides. The closure panel is selectively operative for at least partially closing the opening in the body. The closure panel is attached to the body for movement between a closed position and an open position. In the open position the closure panel is disposed completely below the floor.

In another form, the present invention provides a method of adjusting a closure panel of a motor vehicle. The motor vehicle includes a rear bumper assembly, a body and a rearwardly located storage area with a floor. The method includes the general step of locating the closure panel in a first position immediately above the rear bumper assembly and oriented substantially vertical. The method of the present invention further includes the general step of moving the closure panel to a second position by forwardly displacing a lower end of the closure panel relative to the rear bumper assembly. The method of the present invention additionally includes the general step of translating the closure panel from the second position to a third position in which the closure panel is located completely below the floor.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 5A is a schematic side view similar to FIG. 4 illustrating the closure panel articulated to the closed position and further illustrating a drive arrangement for articulating the closure panel between the closed and open positions.

FIG. 5B is another schematic side view similar to FIG. 4, illustrating the closure panel forwardly displaced to clear the rear bumper assembly.

DETAILED DESCRIPTION OF THE PREFERRED EMBODIMENT

Figure 1:
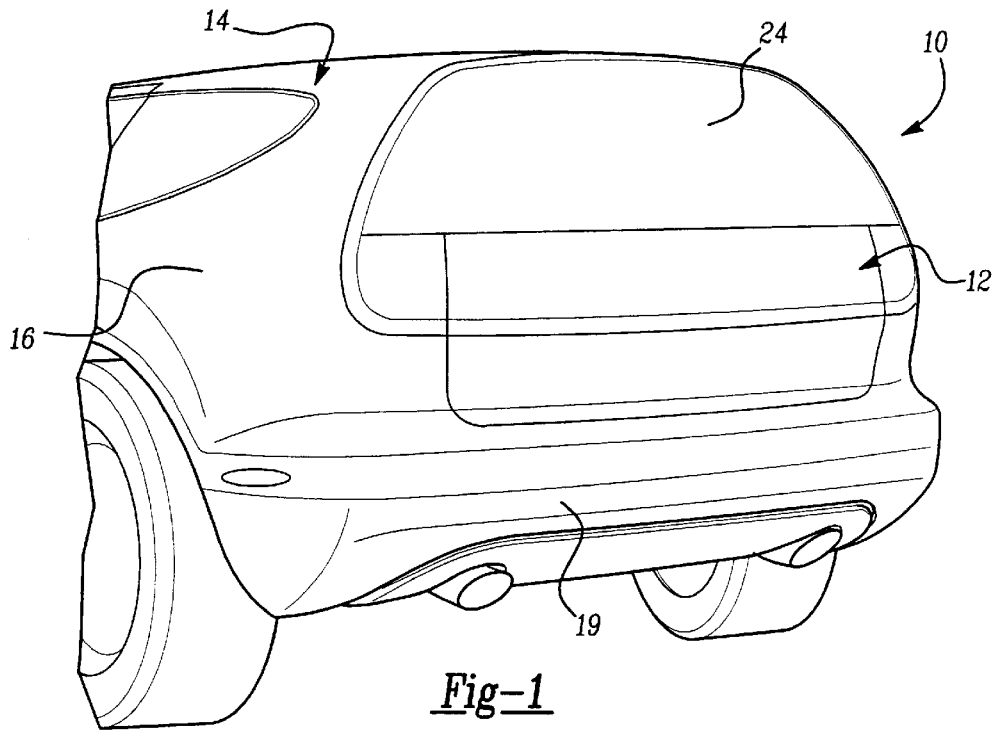
FIG. 1 is a rear perspective of an exemplary motor vehicle constructed in accordance with the teachings of a preferred embodiment of the present invention to include a retractable closure panel, the closure panel illustrated articulated to a closed position.

With reference to FIGS. 1 through 5 of the drawings, a motor vehicle constructed in accordance with the teachings of the preferred embodiment of the present invention is generally identified at reference numeral 10. As will be discussed in detail below, the motor vehicle 10 includes a closure panel 12 which is articulated between a closed position and an open position under a source of power. It will be understood that the particular type of vehicle illustrated throughout the drawings is merely exemplary. In this regard, the teachings of the present invention have applicability to other types of vehicles.

Figure 2:
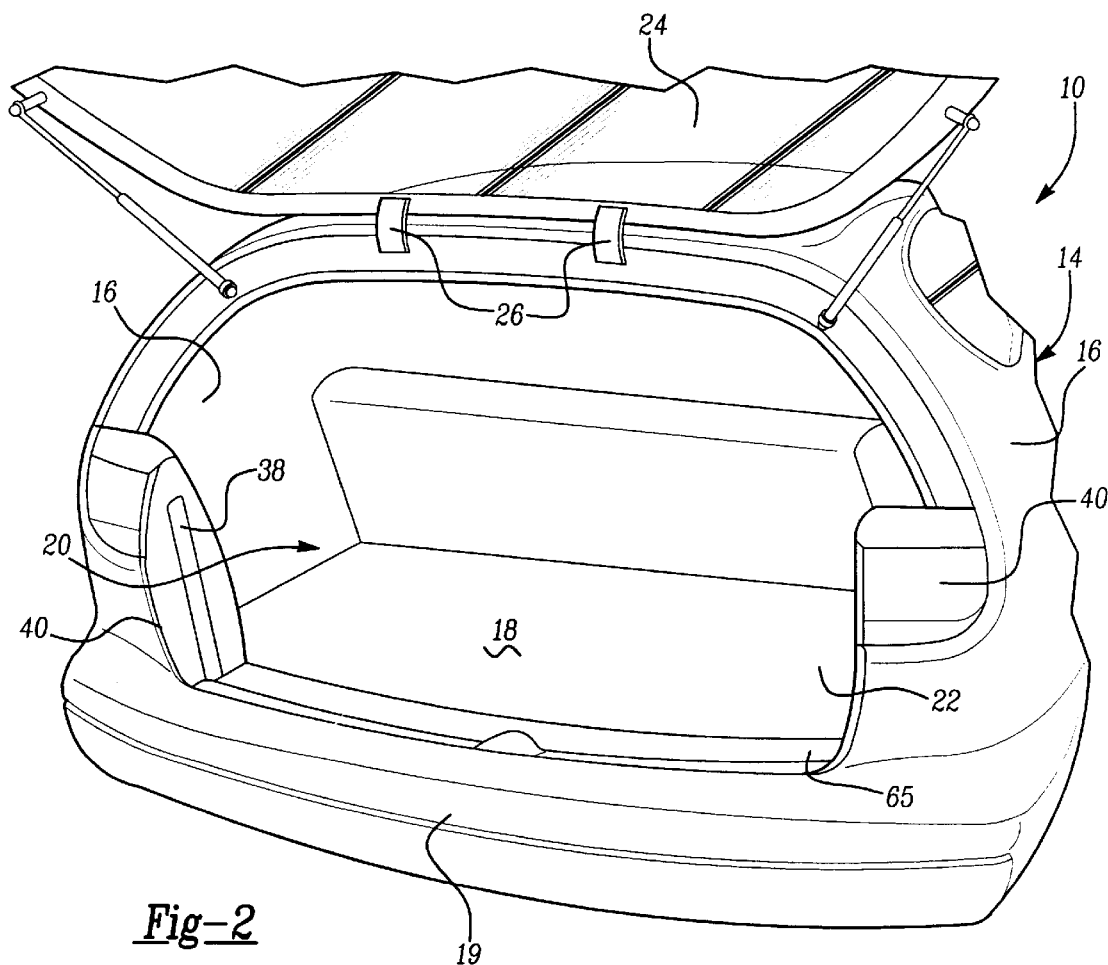
FIG. 2 is an enlarged rear perspective view of the motor vehicle of FIG. 1, illustrated with the closure panel articulated to an open position.
Figure 3:
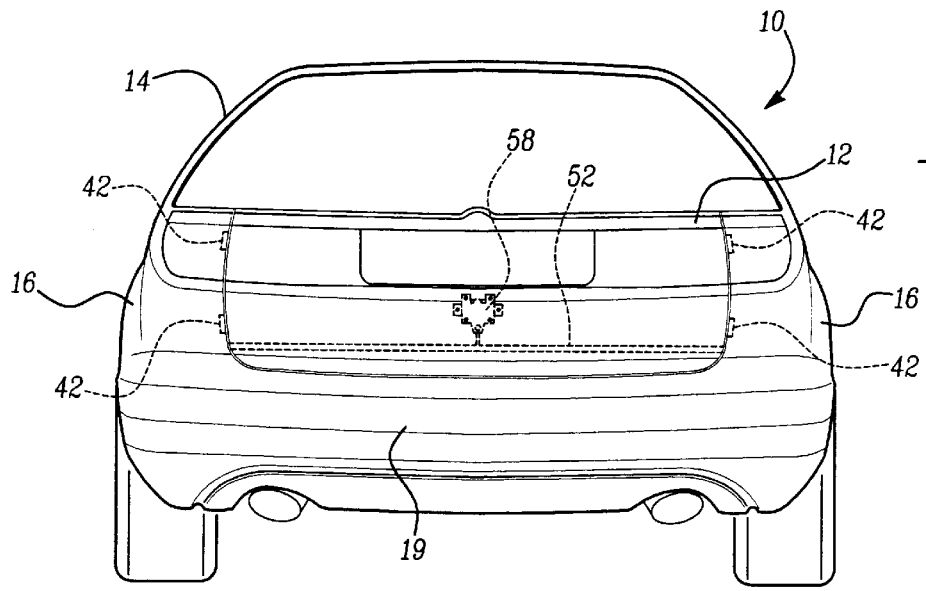
FIG. 3 is a rear view of the motor vehicle of FIG. 1, illustrating a drive arrangement for articulating the closure panel between the open and closed positions under a source of power.
Figure 4:
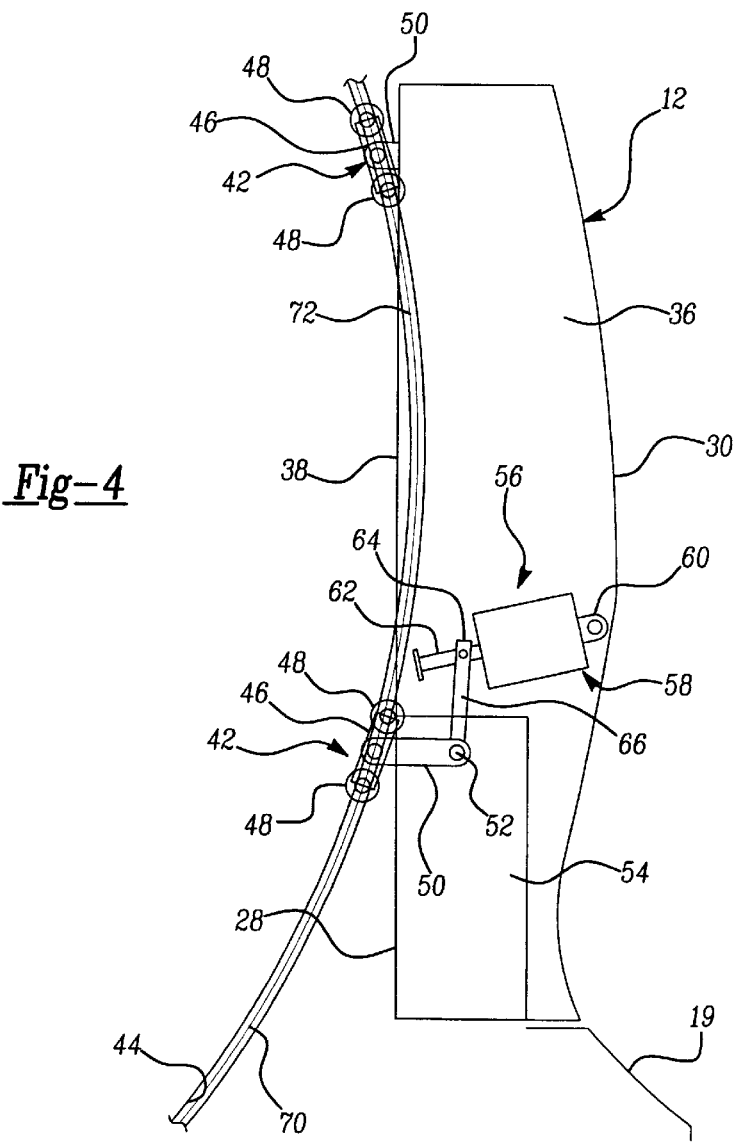
FIG. 4 is a schematic side view of a portion of the vehicle of FIG. 1, illustrating one of the guide tracks mounted to the body of the vehicle and the roller assemblies interconnecting the closure panel with the guide track and a drive arrangement for forwardly displacing the closure panel to clear the rear bumper assembly.
Figure 5C:
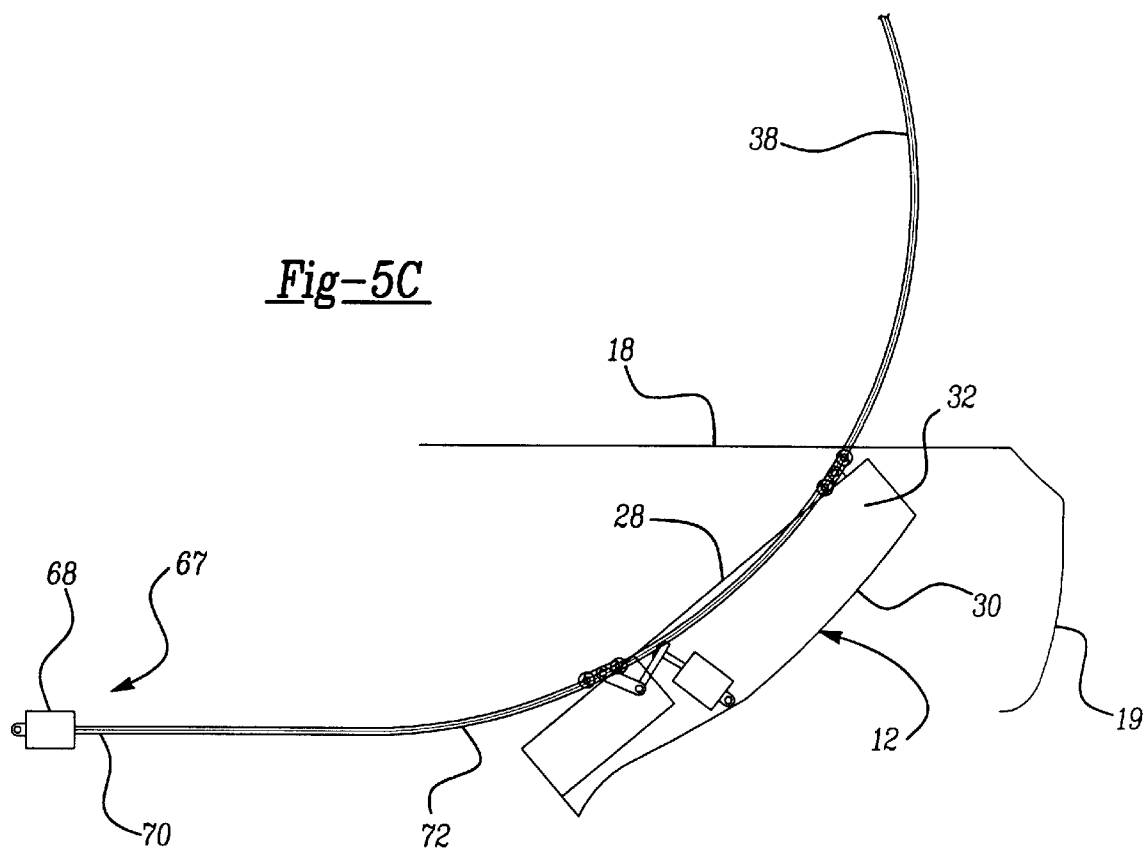
FIG. 5C is another schematic side view similar to FIG. 4, illustrating the closure panel articulated to the open position below the floor of the vehicle.

In a conventional manner, the motor vehicle 10 of the present invention includes a body 14 having a pair of laterally spaced apart sides 16 and a floor 18. The motor vehicle 10 further includes a rear bumper assembly 19. The sides 16 and the floor 18 conventionally cooperate to define a rear storage area 20 accessible through a rear opening 22 in the body 14. The closure panel 12 is preferably illustrated as a tailgate. The closure panel 12 cooperates with a rear glass panel 24 for selectively providing access to the rear storage area 20 through the rear opening 22 in the body 14. The glass panel 24 is conventional in construction and is attached to the body 14 of the vehicle 10 for rotation about an upper, horizontally extending pivot axis through a pair of hinges 26. The glass panel 24 selectively provides restricted access to the rear storage area 20 when the closure panel 12 is articulated to the closed position. The closed position of the closure panel 12 is shown in FIGS. 1, 3, 4 and 5A. The open position of the closure panel 12 is shown in FIGS. 2 and 5C. An intermediate position is shown in FIG. 5B.

The closure panel 12 is shown to conventionally include an inner panel 28 and an outer panel 30. The inner and outer panels 28 and 30 define a door cavity 32. The outer panel 30 is adapted to be flush with adjacent portions of the rear of the motor vehicle 10 when it is articulated to the closed position. The closure panel 12 further includes a pair of lateral sides 36.

The closure panel 12 is slidably mounted the body 14 of the motor vehicle 10 for movement between the open position and closed position. In the exemplary embodiment illustrated, both of the lateral sides 36 of the closure panel 12 are attached to an adjacent one of the sides 16 of the body 14. It will be understood that the structure employed for interconnecting each of the lateral sides 36 of the closure panel 12 to the body 14 is identical. For this reason, like reference numerals are used in the drawings to identify structurally equivalent elements.

The motor vehicle 10 preferably includes a guide track 38 mounted to each of the side walls 16. As shown most particularly in FIG. 2, the guide tracks 38 are preferably mounted to inwardly extending portions 40 of the side 16 which are positioned immediately adjacent the lateral sides 36 of the closure panel 12. The guide tracks 38 are arcuate in shape and extend downwardly and rearwardly from the inwardly extending portions 40.

Each lateral side 36 of the closure panel 12 is associated with a pair of roller assemblies 42 which engage a groove 44 defined by an associated one of the guide tracks 38. In the embodiment illustrated, a first roller assembly 42 of each pair is interconnected to the closure panel 12 near a lower edge thereof and a second roller assembly 42 is interconnected to the closure panel 12 near an upper edge thereof. Each roller assembly 42 includes a body 46 to which a pair of rollers 48 are rotatably mounted in a conventional manner. Each roller assembly 42 is attached to the closure panel 12 through a link 50. The links 50 are pivotally attached at one end to the body 46. The other ends (not shown) of the links 50 associated with the upper roller assemblies 42 are pivotally attached directly to the closure panel 12. For the lower roller assemblies 42, other ends of the links 50 are fixedly mounted to a common rod 52 which passes through the cavity 32 of the closure panel 12. The links 50 associated with the lower roller assemblies 42 are preferably disposed in a recessed portion 54 of the associated lateral side 36.

In the closed position, the closure panel 12 is located immediately above the rear bumper assembly 19. The motor vehicle 10 of the present invention includes a first drive arrangement 56 for forwardly displacing a lower end of the closure panel 12 relative to the rear bumper assembly 19, and thereby allowing the closure panel 12 to be articulated past the rear bumper assembly 19. The drive arrangement 56 is illustrated to include a drive motor 58 disposed within the cavity 32 of the closure panel 12 and pivotally attached to the closure panel 12 through a mounting bracket 60. The motor 58 is operatively associated with a threaded output shaft 62. The output shaft 62 is meshingly engaged with an internally threaded aperture 64 formed in one end of a link 66. The other end of the link 66 is fixedly attached to the rod 52.

Actuation of the motor 58 in a first direction rotates the output shaft 62 so as to displace the link 66 away from the motor 58. This action causes the link 66 to rotate the rod 52 about its longitudinal axis and thereby pivot the link 50 about the longitudinal axis. As shown in FIG. 4, the link 50 is rotated in a clockwise direction. The closure panel 12 effectively pivots about a transversely extending pivot axis proximate to an upper end thereof. As a result, the closure panel 12 is moved from the closed position or first position (shown, for example, in FIG. 5A) to a second or intermediate position (shown, for example, in FIG. 5B) in which the lower edge of the closure panel 12 is forwardly displaced. The closure panel 12 is now positioned above an opening 65 (identified in FIG. 2) located immediately forward of the rear bumper assembly 19. It will be understood that articulation of the closure panel 12 from the intermediate position to the closed position is accomplished in a reverse manner.

To provide means for articulating the closure panel 12 from the intermediate position to the open position or third position, the motor vehicle 10 additionally includes a second drive arrangement 67. The second drive arrangement 67 is illustrated to include a drive motor 68 (shown in FIG. 5C) mounted to the body 14 of the vehicle 12 and located proximate to a lower end 70 of one of the guide tracks 38. The drive motor 68 is operatively associated with a flexible cable 72. The flexible cable 72 is attached to the upper roller assembly 42 associated with the adjacent lateral side 36 of the closure panel 12. The drive motor 68 is actuated in a first direction to draw the closure panel downward from its intermediate position to the open position. Conversely, the drive motor 68 is actuated in a second direction to advance the closure panel upward from the closed position to the intermediate position. The drive motor 68 and flexible cable 72 are substantially identical to window regulator motors and cables used to drive power windows between open and closed positions and need not be discussed in further detail herein.

In the exemplary embodiment, the motors 58 and 68 are sequentially controlled by a single switch (not shown) located in the passenger compartment of the motor vehicle 10. In this regard, when the closure panel 12 is in the closed position manual operation of the switch first functions to actuate the motor 58 for moving the closure panel 12 to the intermediate position. Once this action is completed, the motor 68 is automatically actuated to translate the closure panel 12 to the open position beneath the floor 18. In a reverse manner, manual control of the switch articulates the closure panel 12 from the open position to the closed position. It will be understood that the motors 58 and 68 may also be actuated in a conventional manner with a remote control (not shown).

The method of the present invention is specifically directed to a method of adjusting a closure panel 12 of a motor vehicle such as the motor vehicle 10 detailed herein. The method includes the general step of locating the closure panel in a first position immediately above the rear bumper assembly 19 and oriented substantially vertical. The method of the present invention additionally includes the general step of moving the closure panel 12 to a second position by forwardly displacing a lower end of the closure panel 12 relative to the rear bumper assembly 19. The method of the present invention further includes the general step of translating the closure panel 12 from the second position to a third position in which the closure panel 12 is located completely below the floor 18.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims. In this regard, it will be understood that the teachings of the present invention are applicable for various vehicles, including but not limited to sport utility vehicles, station wagons, minivans and pick-up trucks.

What is claimed is:

1. A motor vehicle comprising:
    a body defining an opening and including first and second laterally spaced apart sides;
    a floor extending between said pair of laterally spaced apart sides;
    a closure panel for selectively closing an opening in said body, said closure panel attached to said body for movement between a closed position and an open position such that in said closed position said closure panel at least partially closes said opening and in said open position said closure panel is disposed completely below said floor; and
    a first drive arrangement for forwardly displacing a lower end of said closure panel relative to a rear bumper assembly.

2. The motor vehicle of claim 1, further comprising at least one guide track attached to one of said first and second laterally spaced apart sides, said closure panel slidably attached to said at least one guide track.

3. The motor vehicle of claim 2, wherein said at least one guide track is arcuate.

4. The motor vehicle of claim 2, further comprising a first roller assembly interconnected to said closure panel and mounted for translation along said at least one guide track.

5. The motor vehicle of claim 4, wherein said first drive arrangement includes:
    a drive motor mounted to said closure panel between an inner panel and an outer panel;
    a link pivotally attached at a first end to said first roller assembly and pivotally attached at a second end to said closure panel; and
    an output member driven by said motor and interconnected to said link for pivoting said link about said second end.

6. The motor vehicle of claim 4, further comprising a second roller assembly interconnected to said closure panel and mounted for translation along said at least one guide track, said second roller assembly being horizontally spaced from said first roller assembly when said closure panel is in said closed position.

7. The motor vehicle of claim 4, further comprising a second drive arrangement for driving said closure panel between said closed position and said open position under a source of power, said drive arrangement including a drive motor and a cable interconnecting said drive motor and said first roller assembly.

8. A motor vehicle comprising:
    a body having a rear bumper assembly and first and second laterally spaced apart sides, said body defining a rear opening;
    a floor extending between said pair of laterally spaced apart sides;
    a rear storage area at least partially defined by said first and second laterally spaced apart sides and said floor, said rear storage area accessible through said rear opening;
    a rear closure panel for selectively closing said rear opening, said closure panel attached to said body for movement between a closed position and an open position such that in said closed position said closure panel at least partially closes said opening and is positioned immediately above said rear bumper assembly, and in said open position said closure panel is disposed completely below said floor; and
    a first drive arrangement for forwardly displacing a lower end of said closure panel relative to said rear bumper assembly.

9. The motor vehicle of claim 8, further comprising first and second guide tracks attached to said first and second laterally spaced apart sides, said closure panel slidably attached to said first and second laterally spaced apart sides.

10. The motor vehicle of claim 9, wherein said first and second guide tracks are arcuate.

11. The motor vehicle of claim 9, further comprising first and second roller assemblies interconnected to said closure panel and mounted for translation along said first and second guide tracks, respectfully.

12. The motor vehicle of claim 11, wherein said first drive arrangement includes:
    a drive motor mounted to said closure panel between an inner panel and an outer panel;
    a pair of links, each link being pivotally attached at a first end to an associated one of said first and second roller assemblies and pivotally attached at a second end to said closure panel; and
    an output member driven by said motor and interconnected to each link of said pair of links for pivoting each said link about said second end.

13. The motor vehicle of claim 11, further comprising third and fourth roller assemblies interconnected to said closure panel and mounted for translation along said first and second guide tracks, respectively, said third and fourth roller assemblies being horizontal spaced from said first and second roller assemblies, respectively, when said closure panel is in said closed position.

14. The motor vechicle of claim 11, further comprising a second drive arrangement for driving said closure panel between said closed position and said open position under a source of power, said drive arrangement including a drive motor and a cable interconnecting said drive motor and closure panel.

15. A method of adjusting a closure panel of a motor vehicle, the motor vehicle including a rear bumper assembly, a body and a rearwardly located storage area with a floor, the method including the steps of:
    locating the closure panel in a first position immediately above the rear bumper assembly and oriented substantially vertical;
    moving the closure panel to a second position by forwardly displacing a lower end of said closure panel relative to the rear bumper assembly; and translating the closure panel from the second position to a third position in which the closure panel is located completely below the floor.

16. The method of adjusting a closure panel of a motor vehicle of claim 15, wherein the step of forwardly displacing a lower end of said closure panel relative to the rear bumper assembly includes the step of pivoting the closure panel about a transversely extending pivot axis proximate to an upper end of the closure panel.

17. The method of adjusting a closure panel of a motor vehicle of claim 16, wherein the step of translating the closure panel from the second position to a third position in which the closure panel is located completely below the floor includes the step of translating the closure panel along an arcuate path.

18. The method of adjusting a closure panel of a motor vehicle of claim 17, wherein the body of the motor vehicle includes first and second sides, and wherein the step of translating the closure panel along an arcuate path includes the steps of:

mounting first and second arcuate guide tracks fixedly to said first and second sides; and slidably interconnecting said closure panel to said first and second guide tracks.

19. he method of adjusting a closure panel of a motor vehicle of claim 18, wherein the closure panel includes laterally spaced apart sides, and wherein the step of slidably interconnecting said closure panel to said first and second guide tracks includes the step of slidably interconnecting said closure panel to each of said first and second guide tracks at spaced apart points.

20. The method of adjusting a closure panel of a motor vehicle of claim 15, wherein the step of translating the closure panel from the second position to a third position includes the step of driving the closure panel between the first position and the second position under a source of power.

* * * * *